(12) United States Patent
Balderas

(10) Patent No.: US 11,230,214 B1
(45) Date of Patent: Jan. 25, 2022

(54) DUMP TRUCK BED WITH A CHAIN ADHERENT RELEASE DEVICE

(71) Applicant: Michael Justin Balderas, Eureka, MO (US)

(72) Inventor: Michael Justin Balderas, Eureka, MO (US)

(73) Assignee: Devine Holdings Corp., Black, MO (US)

( * ) Notice: Subject to any disclaimer, the term of this patent is extended or adjusted under 35 U.S.C. 154(b) by 0 days.

(21) Appl. No.: 17/362,240

(22) Filed: Jun. 29, 2021

(51) Int. Cl.
*B60P 1/26* (2006.01)
*B62D 33/027* (2006.01)

(52) U.S. Cl.
CPC ............ *B60P 1/26* (2013.01); *B62D 33/0273* (2013.01)

(58) Field of Classification Search
CPC ........ B60P 1/26; B60P 1/283; B62D 33/0273; Y10S 37/901
USPC .............................. 298/1 B, 17 R, 22 R, 22 P
See application file for complete search history.

(56) References Cited

U.S. PATENT DOCUMENTS

| | | | |
|---|---|---|---|
| 1,808,251 A * | 6/1931 | Osman | B60P 1/24 298/1 B |
| 2,501,489 A | 4/1946 | Aisthorpe | |
| 3,035,724 A | 5/1962 | Clark | |
| 3,349,934 A | 10/1967 | Moyer | |
| 3,630,396 A | 12/1971 | Womack | |
| 5,228,750 A * | 7/1993 | Hagenbuch | B60P 1/16 298/1 B |
| 5,241,764 A | 9/1993 | Modig | |
| 5,515,624 A | 5/1996 | Beatty | |
| 5,680,717 A | 10/1997 | Bierwith | |
| 7,624,522 B1 | 12/2009 | Ammons | |
| 8,454,095 B1 * | 6/2013 | Dilts | B60P 1/003 298/1 B |
| 2005/0193598 A1 | 9/2005 | Buhse | |
| 2005/0264018 A1 | 12/2005 | Cummings | |
| 2007/0144043 A1 | 6/2007 | Semke | |

FOREIGN PATENT DOCUMENTS

DE                78234           11/1984

* cited by examiner

*Primary Examiner* — Stephen T Gordon
(74) *Attorney, Agent, or Firm* — Linda Lewis

(57) ABSTRACT

The present invention is a dump truck with a bed with a chain adherent release device, wherein the bed has a bottom and two side walls, an inside configured to hold materials, a front wall and a back edge. The bed has a lifted position and a flat, unlifted position. Attached inside the bed is a chain adherent release device which has two bed side chains positioned proximate and parallel to the side walls, at least one bed inner chain spaced between the side chains, and at least one bed cross chain approximately perpendicular to the bed side chains, attached to the side chains and positioned between the front and back of the bed, but not attached to the bottom of the bed. The chains have a sufficient length to have direct contact with the bottom of the bed, and to lie in the bottom of the bed when the bed is in in the flat and unlifted position.

20 Claims, 4 Drawing Sheets

DUMP TRUCK BED WITH A CHAIN ADHERENT RELEASE DEVICE

CROSS-REFERENCE TO RELATED APPLICATIONS

This application is a first filing of the invention.

STATEMENT REGARDING FEDERALLY SPONSORED RESEARCH

Not Applicable.

APPENDIX

Not Applicable.

BACKGROUND OF THE INVENTION

Field of the Invention

The present invention relates to dump truck beds, and more particularly to a chain device for a dump truck bed which effectively removes materials adhering to the bottom of the bed.

Related Art

Excavation equipment, such as a Skid Steer, wheel loader, tractor, or backhoe uses a bucket, and is used to dig and move the materials to a desired location. The materials excavated may comprise soil, mud, clay, rocks, broken concrete, asphalt or other materials. When excavating sticky soil, mud or clay, the material can adhere to the inside wall of the bucket, reducing the capacity of the bucket, and decreasing the working efficiency of the excavator.

For larger loads of excavated materials, excavation equipment load the materials into haulers such as dump trucks, hopper trucks. V-bottom trucks, end dump trucks and haul trucks. A dump truck is equipped with an open box bed which has a hinged tailgate at the back and equipped with hydraulic rams to lift the front from the flat unlifted position to the lifted position, allowing materials in the bed to be dumped on the ground behind the truck. For dump trucks, the same problem as discussed above for excavation equipment may occur, where excavation materials or other hauled materials may adhere to the dump truck bed (also called a dump box) and not be easily released when the bed is "dumped" by raising the front headboard (nearest the cab of the dump truck) and releasing the hinged tailgate to empty the bed.

Cleaning the bed of adherent typically involves the lengthy process of stopping work, shutting down the excavation machine, and prying out the adhering sticky materials. Well known methods of preventing the sticking of materials includes the use of oils on the bed or plastic liners, and the drilling of holes in the bottom of the bed. These methods have very limited effectiveness.

The use of a chain or chains attached to the inside of excavation buckets to remove adherents has been disclosed. However, there is very little description of how the chains are attached or the configuration of the chains that are attached. It has been disclosed that chains can be in an "H" or an "X" configuration, where the chains are attached at the endpoints and the remainder of the chain is loose and lies along the bottom of the bucket. A single chain and two chains have been disclosed. Heavy one inch chains have been disclosed.

Chinese patent CN212026383 discloses a pendant device inside the excavation bucket to dislodge clay or other materials. The pendant uses a chain or wire attached at the back inside of the bucket, and a weight attached at the free end of the chain. In one embodiment there are three pendants with three spaced cross wires attached to the pendants. When the bucket is emptied, the pendant swings to help empty the bucket.

None of the above references disclose the claimed invention as described.

SUMMARY OF THE INVENTION

The present invention is a dump truck bed with a chain adherent release device, wherein the bed has a bed bottom and two side walls, an inside configured to hold materials, a front wall and a back edge. The bed has a lifted position and a flat, unlifted position. Attached inside the bed is a chain system, wherein the chain system has two bed side chains positioned proximate and parallel to the two side walls, at least one bed inner chain spaced between the bed side chains, and at least one bed cross chain attached to the bed side chains and positioned between the front and back of the bed and attached to the at least one bed inner chain, but not attached to the bottom of the bed. The at least one cross chain include a front cross chain proximate the front wall, a back cross chain proximate the back edge and a middle cross chain. The bed side chains, the at least one bed inner chain and the at least one bed cross chain form a grid. Side wall chains are attached to the side chains at side wall attachment points on the side walls of the bed. Front wall chains are attached to bed front cross chains and to front wall attachment points at the front wall of the bed. The bed side chains, the bed inner chains and the bed cross chains are not attached at the back of the bottom of the bed at the back cross chain. The front attachment points are spaced across the front wall of the bed. The at least one bed inner chain, the bed side chains and the at least one bed cross chain have a sufficient length to have contact with the bottom of the bed, and to lie in direct contact with the bottom of the bed when the bed is in in the flat and unlifted position.

Optionally, the bed with a chain adherent release device also includes at least one tailgate chain attached to the tailgate and having the other end attached to the bed middle cross chain. The tailgate chain has sufficient length to allow the bed chains to lie in the bottom of the bed when the bed is in the unlifted position. When the bed is in the lifted position and the tailgate swings open, the tailgate chain pulls the grid out and down to dislodge adhering materials.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
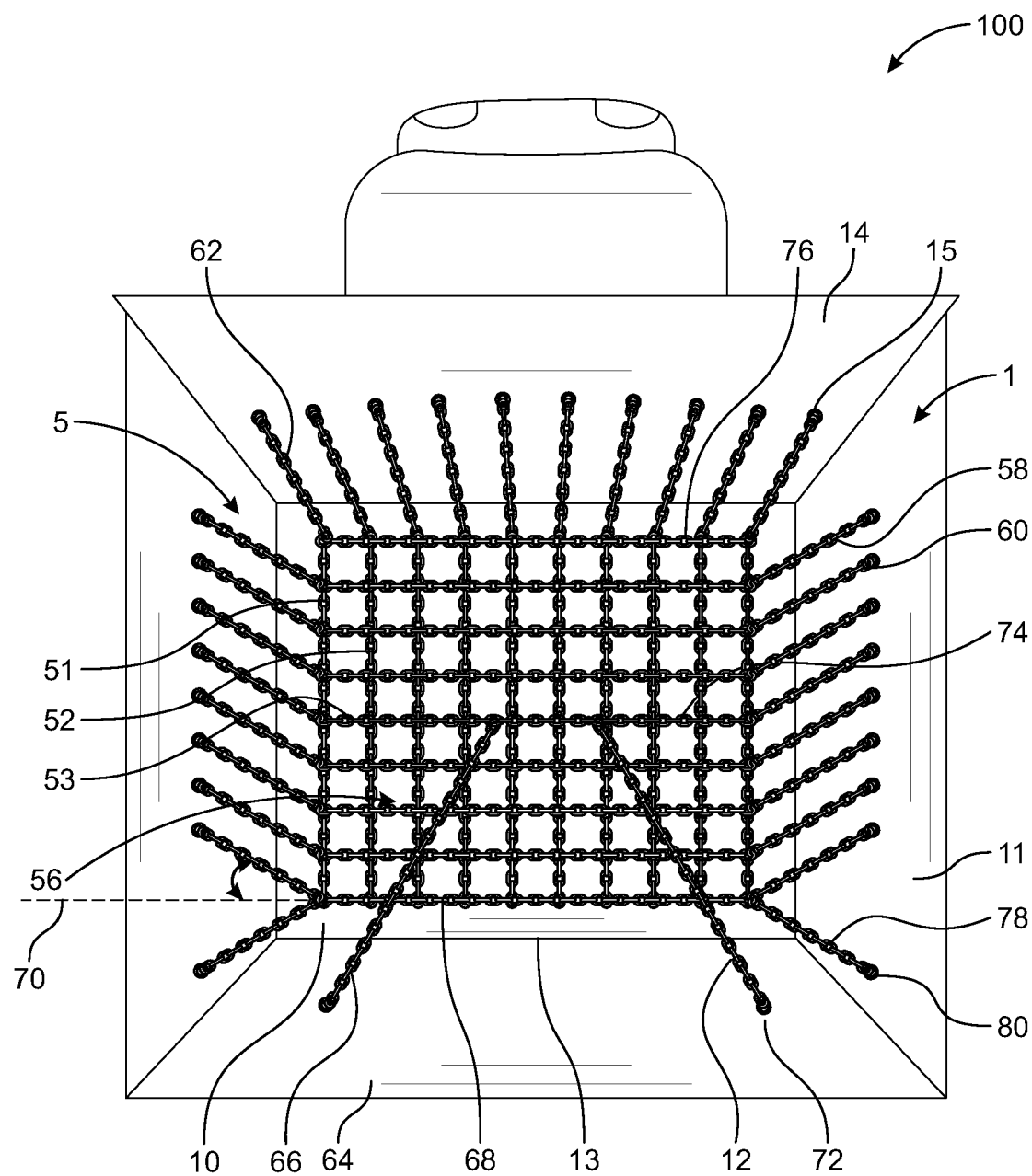
FIG. 1 is a top view of an embodiment of the present invention in the flat and unlifted position with the tailgate closed.
Figure 2:
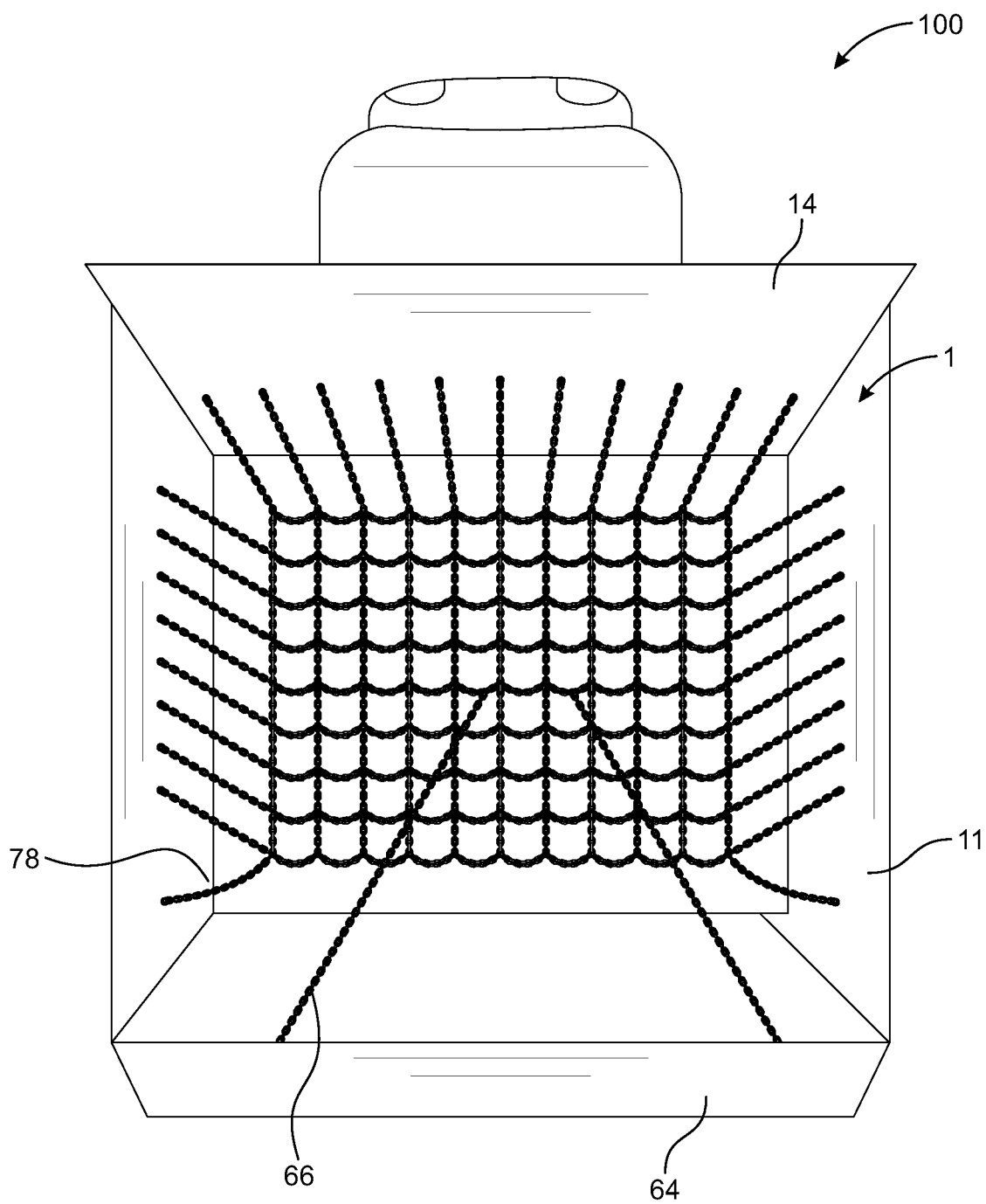
FIG. 2 is a side view of an embodiment of the present invention in the lifted position with the tailgate open.
Figure 3:
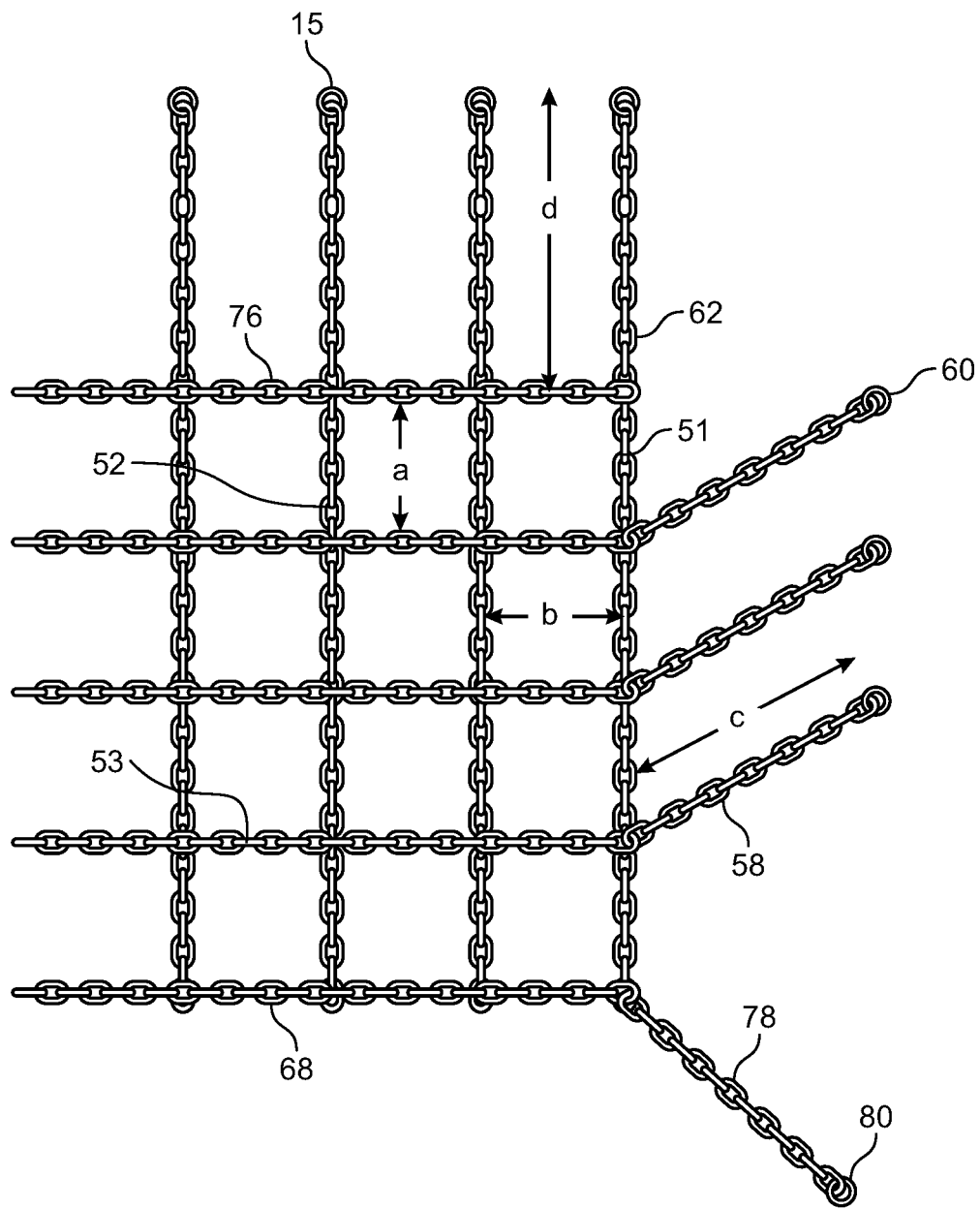
FIG. 3 is a portion of the chain system.

As shown in FIGS. 1, 2 and 3, the present invention is a dump truck with a chain adherent release device 100, wherein the bed (also called a dump box) 10 has a bottom 12 and two side walls 11, an inside 1 configured to hold materials, a back edge 13 (at the tailgate) and a front wall 14 (proximate the truck cab). Attached inside the bed is a chain adherent release device 5 that has two bed side chains 51 positioned proximate and parallel to the two side walls 11, at least one bed inner chain 52 spaced approximately parallel between the side chains, and at least one bed cross chain 53 attached to the bed side chains and positioned between the back edge 13 and front wall 14 of the bed and attached to the at least one bed inner chain, but not attached to the bottom 12 of the bed. The bed side chains, the at least one bed inner chain and the at least one cross chain form an approximate grid. The bed front cross chain 76 is proximate the front wall 14. Side wall chains 58 are attached to bed side chains 51 on one end and the side wall chain attachment points 60 at the other end. The front wall chains 62 bed are attached to the front cross chain 76 on one end and the front wall attachment points 15 at the other end. The front wall attachment points 15 are spaced across the front wall. The at least one bed inner chain, the bed side chains and the at least one bed cross chain have sufficient length to have direct contact with the bottom of the bed and to lie in the bottom of the bed when the bed is in in the flat unlifted position.

Figure 4:
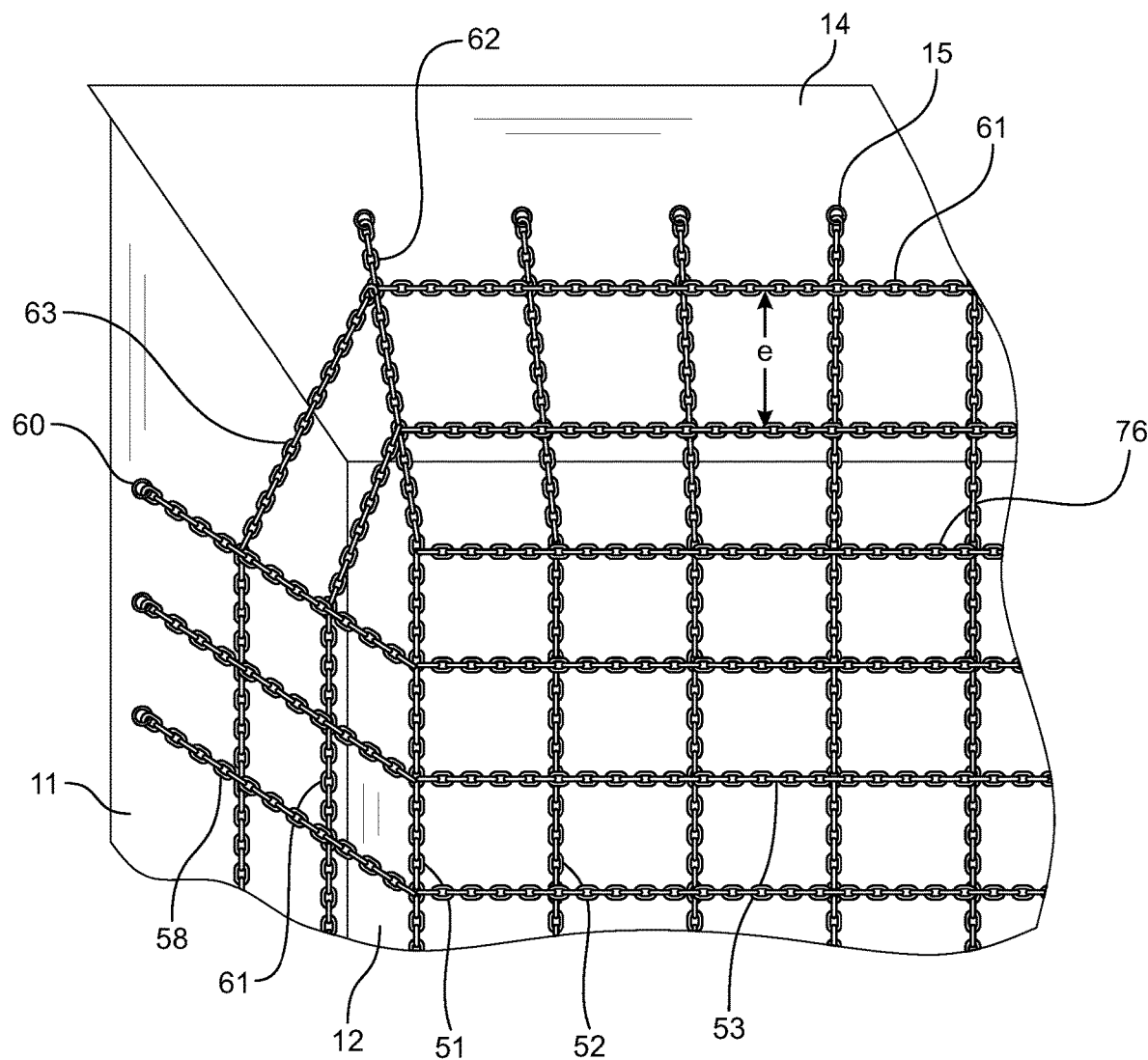
FIG. 4 is the bed side wall and bed front wall forming a corner and having side wall chains and front wall chains with wall cross chains.

As shown in FIG. 4, in a preferred embodiment, the side wall chain 58 and the front wall chain 62 have at least one wall cross chain 61. In another preferred embodiment, there are multiple cross wall chains 61 and they are connected unbroken from the side wall chain 58 to the front wall chain 62 across the corner forming a corner cross wall chain 63. The distance "e" between wall cross chains is in the range of from about six (6) to thirty (30) inches. Preferably the distance is from about fourteen (14) to thirty (30) inches. More preferably, the distance is from about twenty-two (22) to thirty (30) inches.

In a preferred embodiment, as further shown in FIGS. 1 and 2, the dump truck bed with a chain adherent release device 5 also includes at least one tailgate chain 66 attached to a hinged tailgate 64 at the tailgate attachment point 72 at one end of the tailgate chain and attached to a middle cross chain 74 at the other end of the tailgate chain. The middle cross chain 74 is proximate the middle of the bed 10 and is about equidistant from the front wall 14 and the back edge 13. The attachment to the middle cross chain 74 is about equidistant from the two sides 11 of the bed 10. By attaching the tailgate chain 64 proximate the middle cross chain 74, the entire grid pulls out and down when the dump truck is in the lifted position and the tailgate swings open. Attaching the chain to the back cross chain 68 fails to lift the entire grid. The back cross chain 68 is the cross chain closest to the back of the bed. The tailgate chain has sufficient length to allow the grid to lie in direct contact with bottom of the bed when the bed is in the unlifted position. In the lifted position, the tailgate chain pulls the grid out and down to remove adherent material from the bed.

In a preferred embodiment, a tension chain 78 is attached on one end to side wall 11 proximate the back edge 13 of the bed. The other end of the tension chain is attached to the chain grid 56 proximate the back cross chain 68 connected to the bed side chain 51. Preferably there are two tension chains 78, each connected to the back cross chain 68 at the bed side chain 51. The tension chain 78 pulls the grid back into position in the bed after the load is dumped and the bed returns to the unlifted position.

The chain adherent release device is made of metal chains. Each of the side chains, inner chain, cross chain and tailgate chain can be of the same chain material or each of different chain materials. It is important that the chain material be metallic and heavy enough to fall out and downward when the bed is lifted to be emptied and pull the adhering material out of the bottom of the bed. It is also important that the chain material be robust and able to withstand unfavorable conditions, including wet, highly abrasive, rocky and crushing conditions.

Typical chains suitable for the present invention include but are not limited to Grades 30, 43, 70, 80, 100, and 120. The size of the links are sufficiently large to catch and pull out rocks and gravel, but not too small to get plugged up with debris. Preferably, the links are in the range of about ⅛ inch to 1 inch. More preferably, the links are from about ¼ to ¾ inch. More preferably, the links are ⅜ to ½ inch.

As shown in FIGS. 1, 2 and 3, the chain grid 56 made of the bed side chains, the at least one bed inner chain, and the at least one bed cross chain can have preferred dimensions. The dimensions will vary depending on the size of the bed and the materials being carried. A smaller bed may have a smaller grid, while a larger bed may have a larger grid. Preferably, the grid size is approximately 75% the size of the bed as measured by the perimeter of the grid. When installed, the grid is placed proximate the front wall of the bed, leaving a space between the back cross chain 68 and the back edge 13 of the bed. In a preferred embodiment, the distance "b" between the side chain and the inner chain can be in the range of from about six (6) to thirty (30) inches. Preferably the distance is from about fourteen (14) to thirty (30) inches. More preferably, the distance is from about twenty-two (22) to thirty (30) inches. The distance between cross chains "a" is in the range of from about six (6) to thirty (30) inches. Preferably the distance is from about fourteen (14) to thirty (30) inches. More preferably, the distance is from about twenty-two (22) to thirty (30) inches.

Optionally the distance "a" is equal to the distance "b". The distance "d" from the bed front cross chain 76 to the front wall attachment point 15 is in the range of about six (6) to thirty (30) inches. Preferably the distance is from about fourteen (14) to thirty (30) inches. More preferably, the distance is from about twenty-two (22) to thirty (30) inches. The distance "c" from the bed side chain 51 to the side wall attachment point 60 of the side wall chain 58 is in the range of about six (6) to thirty (30) inches. Preferably the distance is from about fourteen (14) to thirty (30) inches. More preferably, the distance is from about twenty-two (22) to thirty (30) inches.

Preferably, there are from five to twenty inner chains. More preferably there are fifteen to twenty inner chains. The optimum number of inner chains depends on the size of the bed, with larger beds having more inner chains. Preferably, there are from five to twenty cross chains. More preferably there are fifteen to twenty cross chains. The optimum number of inner chains depends on the size of the beds, with larger beds having more inner chains.

The grids can have different configurations, such as parallel to the bed sides or diagonal to the bed sides. Other configurations are also contemplated in this invention. A number of configurations were tried and found to be ineffective in removing adherents. A combination of different grids is also contemplated. A smaller grid could be used for the bottom of the bed and combined with larger grids on the sides and front end. It is only with the combination of side chains, at least one inner chain, at least one cross chain that adherents were effectively removed.

As shown in FIG. 2, when the bed is lifted to empty the adherent, the chain grid falls away from the bottom of the bed, particularly at the front wall of the bed, creating a distance from the bottom of the bed to the chain grid. The grid is attached to the front wall and the side walls by front wall chain 62 at front wall chain attachment point 15, and side wall chain 58 at side chain attachment point 60, and the tension chain 78 at the tension chain attachment point 80. Optionally, the grid is attached to the tailgate by tailgate chain which is attached to the bed middle cross chain. The grid is not attached to the bed, but is in direct contact with the bed when in the flat and unlifted position. The grid is not attached by the back cross chain to the bed. This allows the grid 56 to move and fall outward and down when the bed is lifted. This configuration effectively removes the adherent and empties the bed. Preferably, the distance the grid moves is from one to twelve inches. The larger the bed, the greater the distance. For example, for large-scale mining equipment, the bed can hold tons of earth and debris, as much as 60 to 100 tons, and the distance could be in multiple feet.

The chain attachment points to the front wall of the bed can be releaseable attachments or fixed attachments. Releaseable attachments include shackles and other types of robust clips. Preferably fixed attachments include welding.

The bed side chains can be fixedly attached to the at least one bed cross chain, preferably by welding or other forms of attachment. Preferably, the at least one inner bed chains are attached to the at least one bed cross chains by welding or other forms of attachment. The tailgate chains are attached to the bed middle cross chain by welding or other forms of attachment. Preferably, the tailgate chains attach to the tailgate at attachment points 72, approximately midway up the tailgate. If the tailgate chains are attached at the corners of the grid at the back cross chain, the tailgate chain pulls the corners of the grid, but does not move the entire grid and fails to effectively remove adherents. As shown in FIG. 2, when the bed is in the lifted position, the tailgate 64 swings open and the tailgate chains 66 pull the grid toward the back and down toward the edge 13 of the bed. The movement causes the adherent materials to empty from the bed. The length of the tailgate chains are approximately 10 to 14 feet and are adjustable depending on the length of the bed. As shown in FIG. 1, in the flat unlifted position, the back cross chain 68 lies on the bottom 12 of the bed from 4 to 15 feet from the back edge 13 of the bed when the tailgate is closed. If the distance is less than about 18 inches, the grid will not properly reposition in the bed.

FIG. 1 shows a preferred embodiment of the invention in the flat unlifted position. The chain grid 56 is resting in direct contact with the bed bottom 12. The bed has attached to the side walls 11 at least one side wall chain 58 at side wall attachment point 60. The bed also has attached to the front wall 14 at least one front wall chain 62 at front wall chain attachment point 15.

As shown in FIG. 1, the side wall chains 58 are slanted from the bed forward toward the front wall 14, at about 20 to 30 degrees from perpendicular (indicated on FIG. 1 as 70) to the bottom of the bed. If the side chains are perpendicular to the bottom of the bed, there isn't sufficient tension to reposition the grid in the bed when it returns from the lifted position to the unlifted position. At least one of the sidewall chain attachment points 60 is proximate the front wall 14. The side wall chains 58 are attached to the side chains, and optionally the at least one bed cross chain 53. In a preferred embodiment, the bed side chain 51 is attached to the side wall chains, and not attached to the front wall chain attachment point 15. The side wall chains are sufficiently long to allow the bed side chains, the bed inner chains and the bed cross chains to lie in direct contact with the bottom of the bed. In a preferred embodiment, there are from about eight to 20 side wall chains. In a more preferred embodiment, there are from about ten to fifteen side wall chains.

In a preferred embodiment, the distance from the sidewall chain attachment point 60 to the bottom of the bed 12 and the distance from the front wall chain attachment point 15 to the bottom of the bed 12 are about the same. If the height of the front wall chain attachment point is greater than sidewall chain attachment point, the grid sags in the middle and does not lift off the bottom of the bed.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A dump truck having a chain adherent release device comprising:

the dump truck having a bed;

wherein the bed has a lifted position and a flat unlifted position;

wherein the bed has a bottom and two side walls, an inside configured to hold materials, a front wall, and a back edge;

wherein the two side walls each have at least one side wall chain attachment point;

wherein the front wall has at least one front wall chain attachment point;

wherein inside the bed is the chain adherent release device;

wherein the chain adherent release device has two bed side chains positioned proximate and parallel the two side walls, at least one bed inner chain spaced between the bed side chains, and at least one bed cross chain attached to and approximately perpendicular to the bed side chains and positioned between the front wall and the back edge of the bed;

wherein the at least one bed cross chain comprises a bed front cross chain proximate the front wall and a bed back cross chain proximate the back edge of the bed;

wherein the bed side chains, the at least one bed inner chain and the at least one bed cross chain form a chain grid;
wherein the chain grid is not attached to the bottom of the bed;
wherein at least one side wall chain is attached to one of the bed side chains at one end and the side wall attachment point at a second end;
wherein at least one front wall chain is attached to the bed front cross chain at one end and to the front wall attachment point at a second end;
wherein the bed side chains and the at least one bed inner chain each have a first and a second end;
wherein for each of the bed side chains and the at least one bed inner chain, the first end is attached to the front cross chain and the second end is attached to the back cross chain;
wherein the bed front cross chain and the bed back cross chain are not attached to the bed;
wherein the chain grid moves as the bed is moved to the lifted position and moved to the unlifted position;
wherein plural ones of the at least one front wall chain attachment point are spaced across the front wall of the bed; and
wherein the at least one inner chain, the side chains and the at least one cross chain have a sufficient length to lie in direct contact with the bottom of the bed when the bed is in in the flat unlifted position, thereby forming the chain adherent release device.

2. The dump truck of claim 1, further comprising at least one tension chain having two ends wherein one of the ends is attached to one of the side walls proximate a tailgate, and the other end is attached to the back cross chain proximate the bed side chain.

3. The dump truck of claim 2, wherein the distance from the at least one sidewall chain attachment point to the bottom of the bed and the distance from each of the at least one front wall chain attachment points to the bottom of the bed are approximately equal.

4. The dump truck of claim 3, wherein the at least one side wall chain is slanted from the bed forward toward the front wall at about 20 to 30 degrees from perpendicular to the bottom of the bed.

5. The dump truck of claim 4, wherein the bed has the tailgate at the back of the bed;
wherein the tailgate is attached to the side walls and is hinged;
wherein on the tailgate is at least one tailgate attachment point;
wherein the at least one bed cross chain includes a bed middle cross chain;
wherein the bed middle cross chain is located approximately the same distance from the front wall to the back edge of the bed;
wherein an at least one tailgate chain has two ends and a first one of the tailgate chain ends is attached to the bed middle cross chain and a second one of the tailgate chain ends is attached to the at least one tailgate attachment point.

6. The dump truck of claim 5, wherein there are two tailgate chains; and
wherein the two tailgate chains are attached to the bed middle chain proximate the middle of the bed about equidistant from the two side walls.

7. The dump truck of claim 6, wherein at least one wall cross chain is positioned on one of the side walls and front wall and is approximately parallel to the bed;
wherein the at least one wall cross chain has two ends; and
wherein a first one of the wall cross chain ends is attached to the side wall chain and a second one of the wall cross chain ends is attached to the front wall chain.

8. The dump truck of claim 7, wherein in the flat unlifted position, the back bed cross chain rests on the bed of the truck from about 4 to 15 feet from the back edge of the bed.

9. The dump truck of claim 8, wherein the wall cross chain runs from the side wall chain to the front wall chain and includes at least one corner wall chain.

10. A dump truck having a chain adherent release device comprising:
the dump truck having a bed;
wherein the bed has a lifted position and a flat unlifted position;
wherein the bed has a bottom and two side walls, an inside configured to hold materials, a front wall, and a back edge;
wherein the two side walls each have at least one side wall chain attachment point;
wherein the front wall has at least one front wall chain attachment point;
wherein inside the bed is the chain adherent release device;
wherein the chain adherent release device has two bed side chains positioned proximate and parallel the two side walls, at least one bed inner chain spaced between the bed side chains, and at least one bed cross chain approximately perpendicular to the bed side chains and attached to the bed side chains and positioned between the front wall and the back edge of the bed;
wherein the at least one bed cross chain further comprises a bed front cross chain proximate the front wall and a bed back cross chain proximate the back edge of the bed;
wherein the bed side chains, the at least one bed inner chain and the at least one bed cross chain form a chain grid;
wherein the chain grid is not attached to the bottom of the bed;
wherein at least one side wall chain is attached to one of the bed side chains at a first end and the side wall attachment point at a second end;
wherein at least one front wall chain is attached to the bed front cross chain at a first end and to the front wall attachment point;
wherein the bed side chains and the at least one bed inner chain each have a first and a second end;
wherein for each of the bed side chains and the at least one bed inner chain, the first end is attached to the front cross chain and the second end is attached to the back cross chain;
wherein the bed front cross chain and the bed back cross chain are not attached to the bed;
wherein the chain grid moves as the bed is moved to the lifted position and moved to the unlifted position;
wherein plural ones of the at least one front wall chain attachment point are spaced across the front wall of the bed;
wherein the bed has a tailgate at the back of the bed;
wherein the tailgate is attached to the side walls and is hinged;
wherein on the tailgate is at least one tailgate attachment point;
wherein the at least one bed cross chain includes a bed middle cross chain;

wherein the bed middle cross chain is approximately the same distance from the front wall to the back edge of the bed;

wherein at least one tailgate chain has two ends;

wherein a first one of the tailgate chain ends is attached to the bed middle cross chain and a second one of the tailgate chain ends is attached to the at least one tailgate attachment point; and wherein the at least one inner chain, the side chains and the at least one cross chain have a sufficient length to have direct contact with the bottom of the bed and to lie in the bottom of the bed when the bed is in in the flat unlifted position, thereby forming the chain adherent release device.

11. The dump truck of claim 10, wherein at least one wall cross chain is positioned on one of the side walls and front walls and is approximately parallel to the bed;

wherein the at least one wall cross chain runs from the side wall chain to the front wall chain and includes at least one corner wall chain.

12. The dump truck of claim 11, wherein the distance from the at least one sidewall chain attachment point to the bottom of the bed and the distance from the at least one front wall chain attachment point to the bottom of the bed are about equal.

13. The dump truck of claim 12, wherein the at least one side wall chain is slanted from the bed forward toward the front wall at about 20 to 30 degrees from perpendicular to the bottom of the bed.

14. The dump truck of claim 13, wherein the first tailgate chain end is attached to the bed middle cross chain proximate the middle of the bed.

15. The dump truck of claim 14, wherein there are two tailgate chains.

16. The dump truck of claim 15, wherein in the flat unlifted position, the back cross chain rests on the bed of the truck from about 4 to 15 feet from the back edge of the bed.

17. The dump truck of claim 16, wherein the tailgate attachment point is about halfway up the tailgate.

18. A dump truck having a chain adherent release device comprising:

a bed having a lifted position and a flat unlifted position;

wherein the bed has a bottom and two side walls, an inside configured to hold materials, a front wall, and a back edge;

wherein the two side walls each have at least one side wall chain attachment point;

wherein the front wall has at least one front wall chain attachment point;

wherein inside the bed is the chain adherent release device;

wherein the chain adherent release device has two bed side chains positioned proximate and parallel the side walls, at least one bed inner chain spaced between the bed side chains, and at least one bed cross chain approximately perpendicular to the bed side chains, attached to the bed side chains and positioned between the front wall and the back edge of the bed;

wherein the at least one bed cross chain further comprises a bed front cross chain proximate the front wall and a back cross chain proximate the back edge of the bed;

wherein the bed side chains, the at least one bed inner chain and the at least one bed cross chain form a chain grid;

wherein the chain grid is not attached to the bottom of the bed;

wherein at least one side wall chain is attached to one of the bed side chains at a first end and the side wall attachment point at a second end;

wherein at least one front wall chain is attached to the bed front cross chain at a first end and to the front wall attachment point;

wherein the bed side chains and the at least one bed inner chain each have a first and a second end;

wherein for each of the bed side chains and the at least one bed inner chain, a first end is attached to the front cross chain and a second end is attached to the back cross chain;

wherein the front cross chain and the back cross chain are not attached to the bed;

wherein the chain grid moves as the bed is moved to the lifted position and returned to the unlifted position;

wherein plural ones of the at least one front wall chain attachment point are spaced across the front wall of the bed;

wherein the bed has a tailgate at the back of the bed;

wherein the tailgate is attached to the two walls and hinged;

wherein on the tailgate is at least one tailgate attachment point;

wherein the grid has a bed middle cross chain;

wherein the bed middle cross chain is the bed cross chain approximately the same distance from the front wall to the back edge of the bed;

wherein at least one tailgate chain has two ends, a first one of the tailgate chain ends attached to the bed middle cross chain and a second one of the tailgate chain ends attached to the at least one tailgate attachment point;

wherein the chain adherent release device further includes at least one tension chain having two ends;

wherein a first one of the tension chain ends is attached to one of the side walls proximate the tailgate, and a second one of the tension chain ends is attached to the back cross chain proximate one of the bed side chains;

wherein the at least one inner chain, the side chains and the at least one cross chain have a sufficient length to have direct contact with the bottom of the bed and to lie in the bottom of the bed when the bed is in in the flat unlifted position, thereby forming the chain adherent release device.

19. The dump truck of claim 18, wherein the distance between at least one of the side chains and the at least one inner chain can be in the range of from about 22 to 30 inches and the distance between the at least one cross chain and a second at least one cross chain is in the range of from about 22 to 30 inches.

20. The dump truck of claim 18, wherein more than one grid size is used to make the grid.

* * * * *